United States Patent Office 2,742,502
Patented Apr. 17, 1956

2,742,502
PROCESS FOR PRODUCING ANILIDES

Bernard F. Crowe, Ansonia, Conn., and Otto C. Elmer, Fishkill, N. Y., assignors to The Texas Company, New York, N. Y., a corporation of Delaware No Drawing. Application December 31, 1952, Serial No. 329,118

5 Claims. (Cl. 260—562)

This invention relates to the synthesis of anilides of aliphatic acids by reaction between unsaturated compounds, carbon monoxide and formanilide. More particularly, it relates to a process for preparing anilides of aliphatic acids containing between 3 and 30 carbon atoms.

In U. S. 2,542,766, there is disclosed a process for preparing aliphatic acid amides by reacting unsaturated compounds, particularly olefinic hydrocarbons, with carbon monoxide and ammonia or substituted ammonias such as primary amines and secondary amines. The amide-forming reaction of this patent is effected in the presence of a soluble cobalt organic compound and at temperature and pressure conditions which are conventional in the carbonylation reaction wherein olefins, carbon monoxide and hydrogen are converted to organic carbonylic compounds such as aldehydes and ketones. This patent discloses that compounds of the general formula $NHR_2$ in which R is hydrogen or an organic radical can be employed in the process of the invention.

Reaction of olefins, carbon monoxide and aniline in accordance with the process of this patent results in the formation of aliphatic acid anilides in accordance with the following equation:

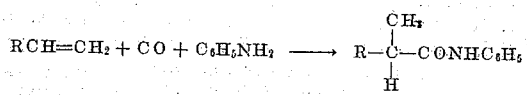

Investigation of this reaction showed that the yields were substantially lowered by the by-product formation of diphenyl urea by reaction of aniline with carbon monoxide at the conditions employed in the reaction.

This invention involves the discovery that aliphatic acid anilides can be prepared by the reaction of unsaturated compounds with formanilide in a carbon monoxide atmosphere at a temperature between 80 and 210° C., at a pressure of 500 to 6,000 pounds per square inch gauge (p. s. i. g.) and in the presence of cobalt carbonyl. The anilide-forming reaction of this invention is not accompanied by the formation of by-product diphenyl urea so that excellent yields are obtained. The reaction whereby aliphatic acid anilides are produced by the process of this invention is illustrated by the following equation:

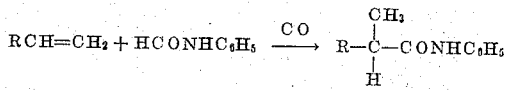

The anilides resulting from the process of this reaction are useful intermediates in the preparation of a large variety of other products. The anilides can be converted by hydrolysis to organic acids and by known methods to a large number of substituted aliphatic acid anilides.

The unsaturated compounds which may be employed in the process of the invention for the formation of anilides comprise olefinic hydrocarbons and other organic compounds containing a non-benzenoid double bond between two carbon atoms. The olefinic hydrocarbons which may be used in the process of the invention include aliphatic olefins such as ethylene, butylene, pentene, etc., cyclonaphthenes such as cyclohexene and pinene and alkenyl aryl compounds such as styrene and alpha-methyl styrene. Among the substituted olefinic hydrocarbons that can be employed in the process of the invention are included unsaturated esters and ketones. The use of substituted hydrocarbons containing a non-benzenoid olefinic bond is illustrated by the following reactions: the production of the monomethyl ester of methyl malonic acid anilide,

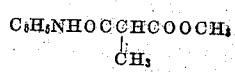

by the reaction of methyl acrylate with formanilide; the production of 2-methyl-5-hydroxy pentanoic acid anilide,

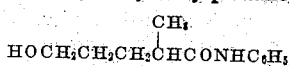

by the reaction of 5-hydroxy-1-pentene with formanilide; the production of 2-methyl levulinic acid anilide,

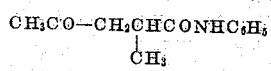

by the reaction of methyl 2-propenyl ketone with formanilide.

The reaction between unsaturated compounds and formanilide in a carbon monoxide atmosphere to yield aliphatic acid anilides is effected at a temperature between 80 and 210° C. with a temperature between 150 and 200° C. being preferred. Pressures above 500 p. s. i. g. are required to effect the formation of anilides, but usually pressures between 1,500 and 5,500 p. s. i. g. are employed in the process of the reaction. Normally, temperature and pressure are dependent variables so that it is possible to employ lower pressures at higher temperatures and higher pressures when lower temperatures are employed.

The active catalyst for the anilide-forming reaction of this invention is cobalt carbonyl. The cobalt carbonyl catalyst can be formed in situ by the action of carbon monoxide on cobalt compounds or can be preformed and introduced into the reaction dissolved in a solvent which can be either the olefin reactant or an inert hydrocarbon solvent such as naphtha and kerosene.

Cobalt carbonyl is formed in situ by the action of the carbon monoxide atmosphere on metallic cobalt, on soluble organic cobalt compounds or on insoluble inorganic cobalt salts; cobalt acetate, cobalt naphthenate and cobalt stearate are examples of soluble organic salts from which cobalt carbonyl can be formed in situ; cobalt oxide and cobalt carbonate are inorganic cobalt compounds which yield cobalt carbonyl by reaction with carbon monoxide. It is preferred to employ soluble organic cobalt compounds for in situ formation of cobalt carbonyl.

Preformed cobalt carbonyl for use in the process of the invention is simply prepared by the action of carbon monoxide or a hydrogen-carbon monoxide mixture on organic cobalt salts, cobalt metal or inorganic cobalt compounds in the presence of a solvent for cobalt carbonyl at a temperature between 50 and 200° C. and an elevated pressure of 500 p. s. i. g. Normally, temperature and pressure conditions similar to those employed in the production of the anilide are used for the formation of cobalt carbonyl. Hydrocarbons are normally employed as the solvent in formation of preformed cobalt carbonyl; benzene, saturated naphtha and kerosene, which are inert under the reaction conditions may be used in the preparation of preformed cobalt carbonyl. A modification which is particularly favored involves preformation of the cobalt carbonyl in the presence of the olefin reactant as a solvent for the cobalt carbonyl. Use of this modification avoids the introduction of another component into the reaction system and simplifies the product recovery system.

The cobalt carbonyl catalyst is highly active so that it is used in only a small percentage of the total reaction mixture. Excellent conversions are obtained with as little as 0.1 to 1.0 per cent cobalt carbonyl of the total reaction mixture, but catalyst concentrations between 0.1 and 3 or more weight per cent can be used.

The anilide-forming reaction of the invention is effected either continuously or batch-wise. If the reaction is effected in the continuous operation, it is recommended that a contact time between 15 and 200 minutes be observed in the reaction zone. The continuous type operation is simply effected by passing a mixture of olefin, formanilide and gaseous carbon monoxide through a reaction zone containing cobalt carbonyl at such a velocity that the aforementioned 15 to 200 minute contact time is realized. The olefin and formanilide are employed in approximately equimolecular proportions. The carbon monoxide medium is, of course, present in very large excess.

In batch operation, approximately equimolecular amounts of olefin and formanilide are introduced into a vessel which is then charged with carbon monoxide and raised to the precribed temperature and pressure levels.

The aliphatic acid anilide resulting from the reaction of olefin with formanilide in a carbon monoxide atmosphere is recovered from the reaction product by fractional distillation. Unconverted olefin and formanilide are recovered as foreruns prior to the anilide product. The distillation residue containing metallic cobalt and organic cobalt compounds can be employed as a source of cobalt carbonyl. Preferably, the residue is recycled to the reaction zone where the active cobalt carbonyl catalyst is formed by the action of carbon monoxide.

The process of the invention is illustrated in the following examples which clearly demonstrate that aliphatic acid anilides are prepared from olefins and formanilide in a carbon monoxide atmosphere without diphenyl urea formation.

Example I illustrates the production of anilides by the reaction of an olefin with carbon monoxide and aniline; Example II illustrates the preparation of anilides by the reaction of olefins with formanilide in a carbon monoxide atmosphere in accordance with the process of the invention.

*Example I*

224 g. (2 mols) of octylene-1, 186 g. (2 mols) of aniline and 3 g. of cobalt carbonyl were charged to a pressure reactor under a blanket of nitrogen. The reactor was then pressured to 3,000 p. s. i. g. with pure carbon monoxide and the temperature raised to about 400° F. Maximum pressure registered during the reaction was about 5,100 p. s. i. g. After four-hour reaction time during which 625 p. s. i. g. of gas had been consumed, the unit was depressured. The reaction product was removed from the reactor which was washed with acetone to complete the product removal. The reaction product and residue from evaporation of the acetone wash were combined and dissolved in hot heptane. On filtration of the hot heptane solution, 15 g. of solid diphenyl urea were obtained. The heptane filtrate was then stripped and distilled whereby a yield of 310 g. of $C_9$ anilide was obtained after removal of the octylene-1 and aniline foreruns. The yield of $C_9$ anilide was 69 per cent of theoretical based on the octylene-1 actually consumed in the reaction.

*Example II*

224 g. (2 mols) of octylene-1, 242 g. (2 mols) of formanilide and 3 g. of cobalt carbonyl were charged to a reactor and pressured to 3,000 p. s. i. g. with pure carbon monoxide. The temperature was raised to about 400° F. and kept there for four hours during which time the gauge registered a maximum pressure of about 5,400 p. s. i. g. 185 p. s. i. g. gas consumption was noted during the reaction. After cooling and venting the reactor, the product was removed and the reactor washed with acetone. The reaction product and the residue from evaporation of the acetone were combined and distilled. After removal, 358 g. of $C_9$ anilide were obtained which, on recrystallization from acetone, had a melting point of 53 to 56° C. This yield is 77 per cent of theoretical based on octylene-1 actually consumed. No substitute ureas, and particularly neither diphenyl urea nor N-diphenyl-N-diformyl urea, were detected in the reaction product.

The necessity of effecting the reaction in a carbon monoxide atmosphere was demonstrated by the fact that substitution of nitrogen for carbon monoxide in the process illustrated in Example II resulted in the production of no $C_9$ anilide whatsoever. This experiment conclusively demonstrates the essential role played by the carbon monoxide atmosphere in the production of aliphatic acid anilides by the reaction of olefins with formanilide.

The foregoing examples clearly demonstrate that the improved process of this invention for preparing aliphatic acid anilides is not accompanied by troublesome formation of diphenyl urea. They also demonstrate that better yields of aliphatic acid anilides are obtained by reacting an olefin with formanilide in a carbon monoxide atmosphere than by reacting an olefin with carbon monoxide and aniline under substantially similar reaction conditions.

Obviously, many modifications and variations of the invention as hereinbefore set forth may be made without departing from the spirit and scope thereof, and therefore only such limitations should be imposed as are indicated in the appended claims.

We claim:

1. A process for preparing aliphatic acid anilides from olefinic unsaturated hydrocarbon and oxygenated hydrocarbon compounds selected from the group consisting of aliphatic olefins, cyclonaphthenes, aryl substituted olefins, esters, and ketones which comprises reacting at least one of said unsaturated compounds with preformed formanilide in a carbon monoxide atmosphere, said reaction being effected in the presence of cobalt carbonyl at a temperature between 80° and 200° C. and at a pressure between 500 and 6,000 p. s. i. g.

2. A process according to claim 1 in which the reaction is effected at a temperature between 150 and 200° C.

3. A process according to claim 1 in which the reaction is effected at a pressure between 1,500 and 5,500 p. s. i. g.

4. A process according to claim 1 in which approximately equimolecular amounts of said unsaturated compound and formanilide are employed.

5. A process according to claim 1 in which an olefinic hydrocarbon is reacted with formanilide.

References Cited in the file of this patent

UNITED STATES PATENTS 2,542,766     Gresham _____ Feb. 20, 1951

OTHER REFERENCES

Buckley and Ray: Jour. Chem. Soc. (London), 1949, pp. 1151–4.